(12) United States Patent
Sabih et al.

(10) Patent No.: US 7,071,679 B1
(45) Date of Patent: Jul. 4, 2006

(54) TESTING OF A SYSTEM-ON-A-CHIP HAVING A PROGRAMMABLE SECTION AND A PLURALITY OF HIGH-SPEED INTERFACES

(75) Inventors: Sabih Sabih, Austin, TX (US); Jari Vahe, Austin, TX (US)

(73) Assignee: Xilinx, Inc., San Jose, CA (US)

( * ) Notice: Subject to any disclaimer, the term of this patent is extended or adjusted under 35 U.S.C. 154(b) by 374 days.

(21) Appl. No.: 10/444,910

(22) Filed: May 23, 2003

(51) Int. Cl.
*G01R 31/02* (2006.01)

(52) U.S. Cl. .................................. 324/158.1; 324/765
(58) Field of Classification Search ...................... None
See application file for complete search history.

(56) References Cited

U.S. PATENT DOCUMENTS

| | | | | |
|---|---|---|---|---|
| 4,903,024 A | * | 2/1990 | Evans et al. ................ | 341/120 |
| 5,331,274 A | * | 7/1994 | Jarwala et al. ............ | 324/158.1 |
| 5,787,094 A | * | 7/1998 | Cecchi et al. ................ | 714/807 |
| 6,619,549 B1 | * | 9/2003 | Zhu et al. .............. | 235/462.45 |
| 6,904,375 B1 | | 6/2005 | Sabih et al. .................. | 702/75 |

* cited by examiner

*Primary Examiner*—Ernest Karlsen
(74) *Attorney, Agent, or Firm*—Tim Markison

(57) ABSTRACT

Testing of a system-on-a-chip having a programmable section and a plurality of high-speed interfaces begins by configuring the programmable section to support a $1^{st}$ level testing of the plurality of high-speed interfaces. The testing continues by testing one of the plurality of high-speed interfaces at the $1^{st}$ level of testing via the programmable section. The testing continues by evaluating the tested performance characteristics in accordance with the prescribed performance characteristics of the standard to determine whether the one of the plurality of high-speed interfaces conforms with the standard requirements. When the one of the plurality of high-speed interfaces conforms with the standard requirements, the plurality of high-speed interfaces are configured for a $2^{nd}$ level testing, where the $1^{st}$ level testing is more stringent than the $2^{nd}$ level testing. The testing continues by testing, at the $2^{nd}$ level, remaining ones of the plurality of high-speed interfaces.

11 Claims, 8 Drawing Sheets

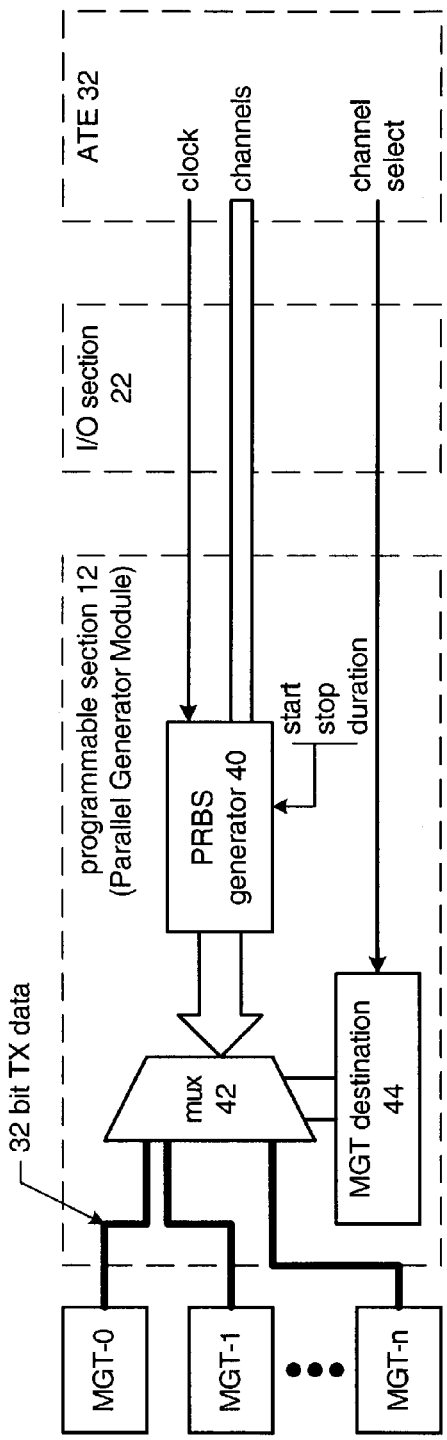
Figure 4 - PGM
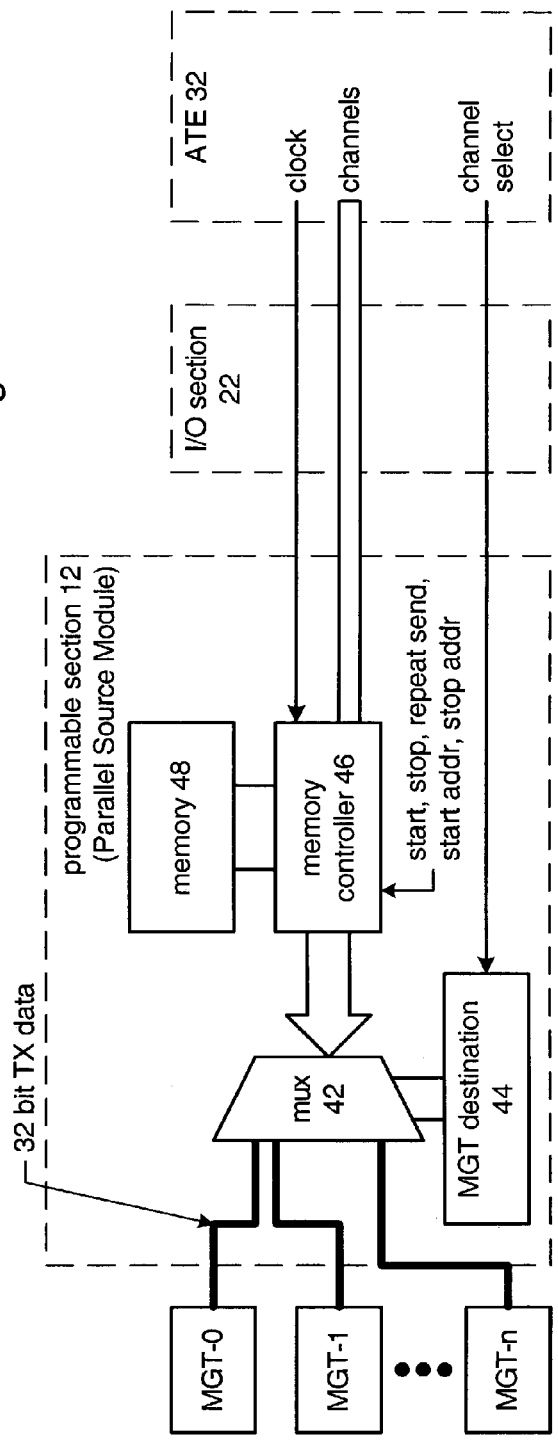
Figure 5 - PSM

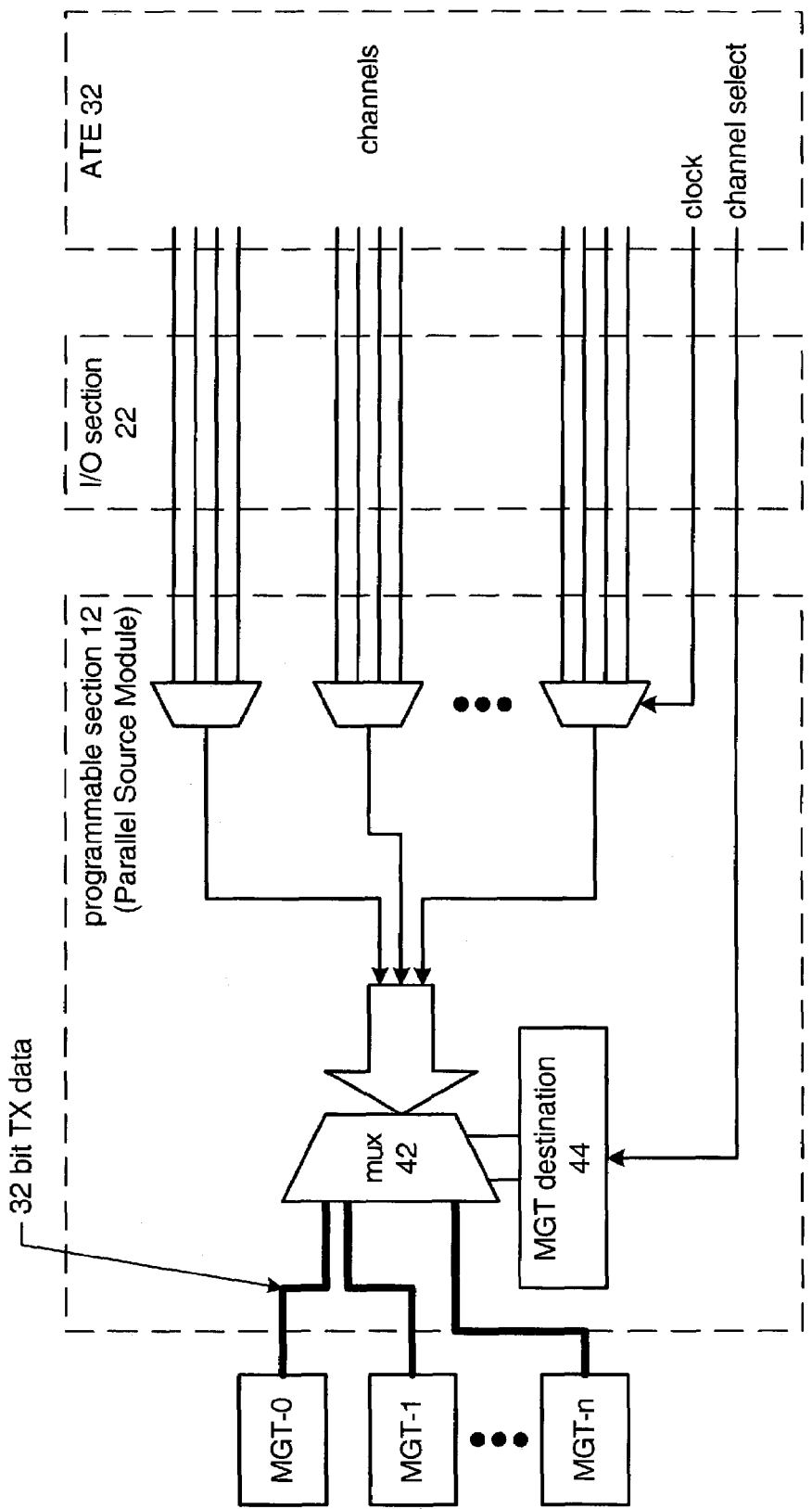
Figure 6 - PSM

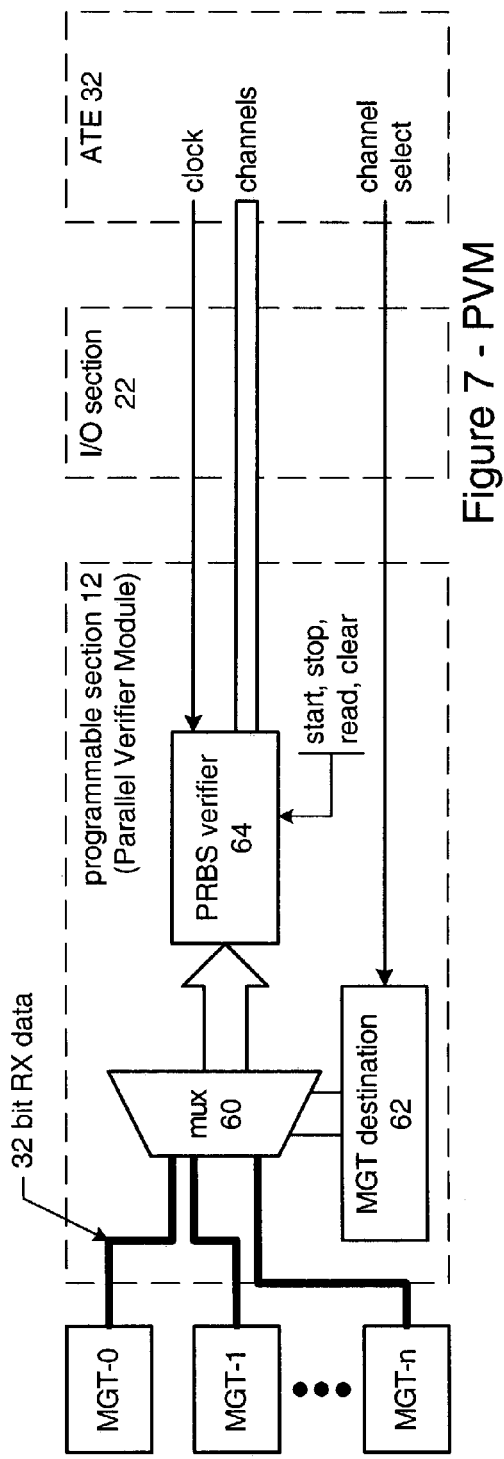
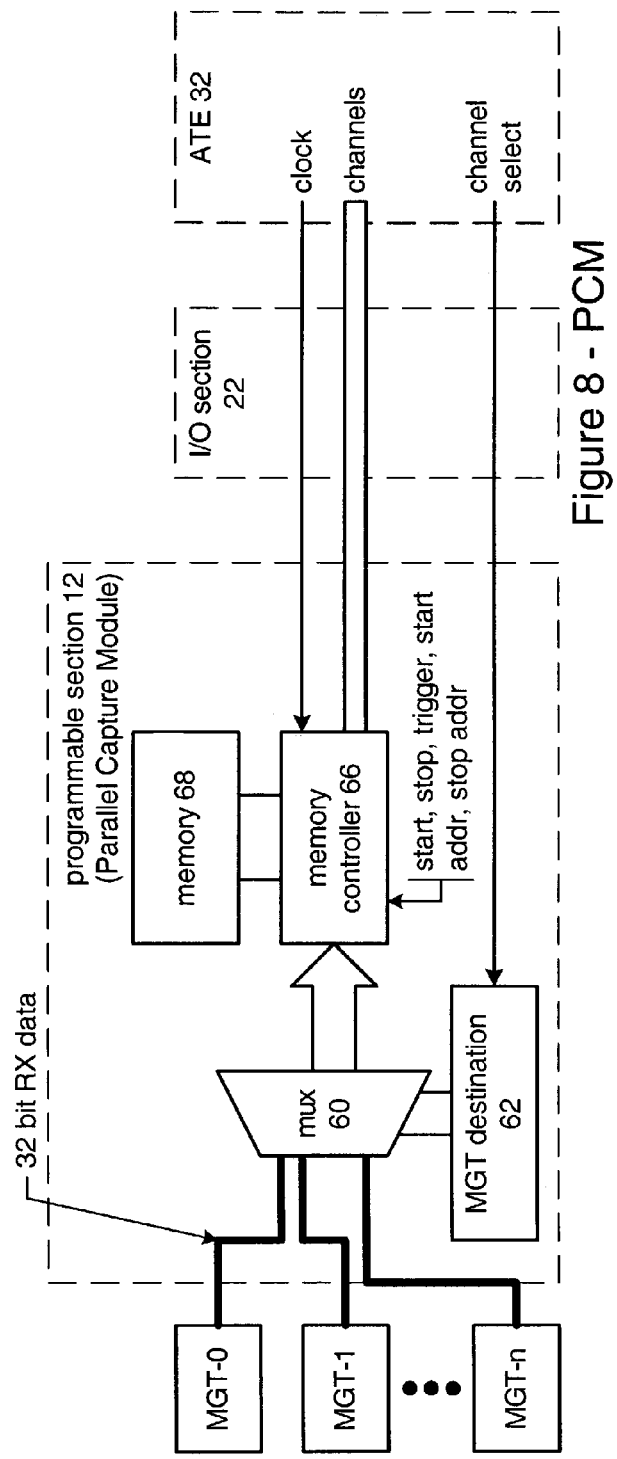

TESTING OF A SYSTEM-ON-A-CHIP HAVING A PROGRAMMABLE SECTION AND A PLURALITY OF HIGH-SPEED INTERFACES

BACKGROUND OF THE INVENTION

1. Technical Field of the Invention

This invention relates generally to integrated circuits and more particularly to testing of such integrated circuits.

2. Description of Related Art

As is known, speed, efficiency, and accuracy of testing integrated circuits is a critical component in the commercial success of an integrated circuit. For instance, if the integrated circuit test process does not accurately test the integrated circuits, then a significant number of field failures may occur, which would rapidly deteriorate its customer base. Further, if an accurate testing process is time consuming, the cost of such testing may render the integrated circuit commercially unviable. Still further, many integrated circuits are tested using automated test equipment (ATE), which may be a dedicated piece of equipment to test one type of integrated circuit or configurable to test multiple integrated circuits. As is known, the cost of automated test equipment increases substantially as the degree of configurability increases, which directly impacts the commercial viability of the corresponding integrated circuits.

A further issue with automated test equipment is the ever-increasing speed at which integrated circuits are transmitting, receiving and/or processing data. Thus, but for the most sophisticated and hence most expensive automated test equipment, such high-speed integrated circuits are tested on a pass/fail basis. For example, a field programmable gate array (FPGA) integrated circuit that includes a plurality of multi-gigabit transceivers, which can be configured to support multiple data transmission rates for a number of standards, is tested on a pass/fail basis at the most stringent of the data transmission rates for the most stringent standard requirements. Such testing is done in a loop-back configuration (e.g., the output of one multi-gigabit transceiver is tied to the input of another) using customized test equipment since no commercial tester is available. Such testing is done one multi-gigabit transceiver at a time, which adds to the duration of the overall test.

While such testing of an FPGA with multi-gigabit transceivers provides a pass/fail response, which indicates whether the FPGA integrated circuit can be sold, it provides no information regarding the reason for the failure, does not optimize yield, and is relatively slow due to the serial testing of the transceivers.

Therefore, a need exists for a method and apparatus for testing a system-on-a-chip that includes high-speed interfaces that improves yield, provides information regarding the reason for a failure, and is time efficient.

BRIEF SUMMARY OF THE INVENTION

The testing of a system-on-a-chip having a programmable section and a plurality of high-speed interfaces of the present invention substantially meets these needs and others. In one embodiment, testing of a system-on-a-chip having a programmable section and a plurality of high-speed interfaces (e.g., a field programmable gate array having a plurality of multi-gigabit transceivers) begins by configuring the programmable section to support a $1^{st}$ level testing of the plurality of high-speed interfaces. The testing continues by testing one of the plurality of high-speed interfaces at the $1^{st}$ level of testing via the programmable section, where the $1^{st}$ level of testing tests performance characteristics of the one of the plurality of high-speed interfaces to produce tested performance characteristics. The $1^{st}$ level of testing may be in accordance with one of a plurality of standards that has the most rigid requirements for data transmission speeds, which range from 1.25 gigabits-per-second to tens of gigabits-per-second. Such performance characteristics include jitter tolerance, jitter transfer, rise-and-fall times, bit error rates, drive capacities, and/or receiver input sensitivity.

The testing continues by evaluating the tested performance characteristics in accordance with the prescribed performance characteristics of the standard to determine whether the one of the plurality of high-speed interfaces conforms with the standard requirements. When the one of the plurality of high-speed interfaces conforms with the standard requirements, the plurality of high-speed interfaces are configured for a $2^{nd}$ level testing, where the $1^{st}$ level testing is more stringent than the $2^{nd}$ level testing. The testing continues by testing, at the $2^{nd}$ level, remaining ones of the plurality of high-speed interfaces. As such, a testing approach for system-on-a-chips having programmable section and a plurality of high-speed interfaces is achieved that provides information as to the type of failure via the $1^{st}$ level testing, is time efficient, and improves yield.

In another embodiment, a system-on-a-chip having a plurality of high-speed interfaces may be tested by first determining performance characteristics of one of the plurality of high-speed interfaces via $1^{st}$ level testing. The testing then continues by comparing the performance characteristics of the high-speed interface with prescribed performance characteristics of one of a plurality of standards. When the performance characteristics compares favorably to the prescribed performance characteristics of the standard, the plurality of high-speed interfaces are configured for $2^{nd}$ level testing, which is less stringent than the $1^{st}$ level testing. The testing continues by testing, via the $2^{nd}$ level testing the remaining ones of the plurality of high-speed interfaces.

BRIEF DESCRIPTION OF THE SEVERAL VIEWS OF THE DRAWINGS

FIG. 4 is a schematic block diagram of a parallel generator module as configured within the system-on-a-chip as illustrated in FIGS. 2 and/or 3;

FIG. 5 is a schematic block diagram of a parallel source module as configured within the system-on-a-chip as illustrated in FIGS. 2 and/or 3;

FIG. 6 is a schematic block diagram of a parallel source module as configured within the system-on-a-chip as illustrated in FIGS. 2 and/or 3;

FIG. 7 is a schematic block diagram of a parallel verifier module as configured within the system-on-a-chip of FIGS. 2 and/or 3;

FIG. 8 is a schematic block diagram of a parallel capture module as configured within the system-on-a-chip as illustrated in FIGS. 2 and/or 3;

DETAILED DESCRIPTION OF THE INVENTION

Figure 1:
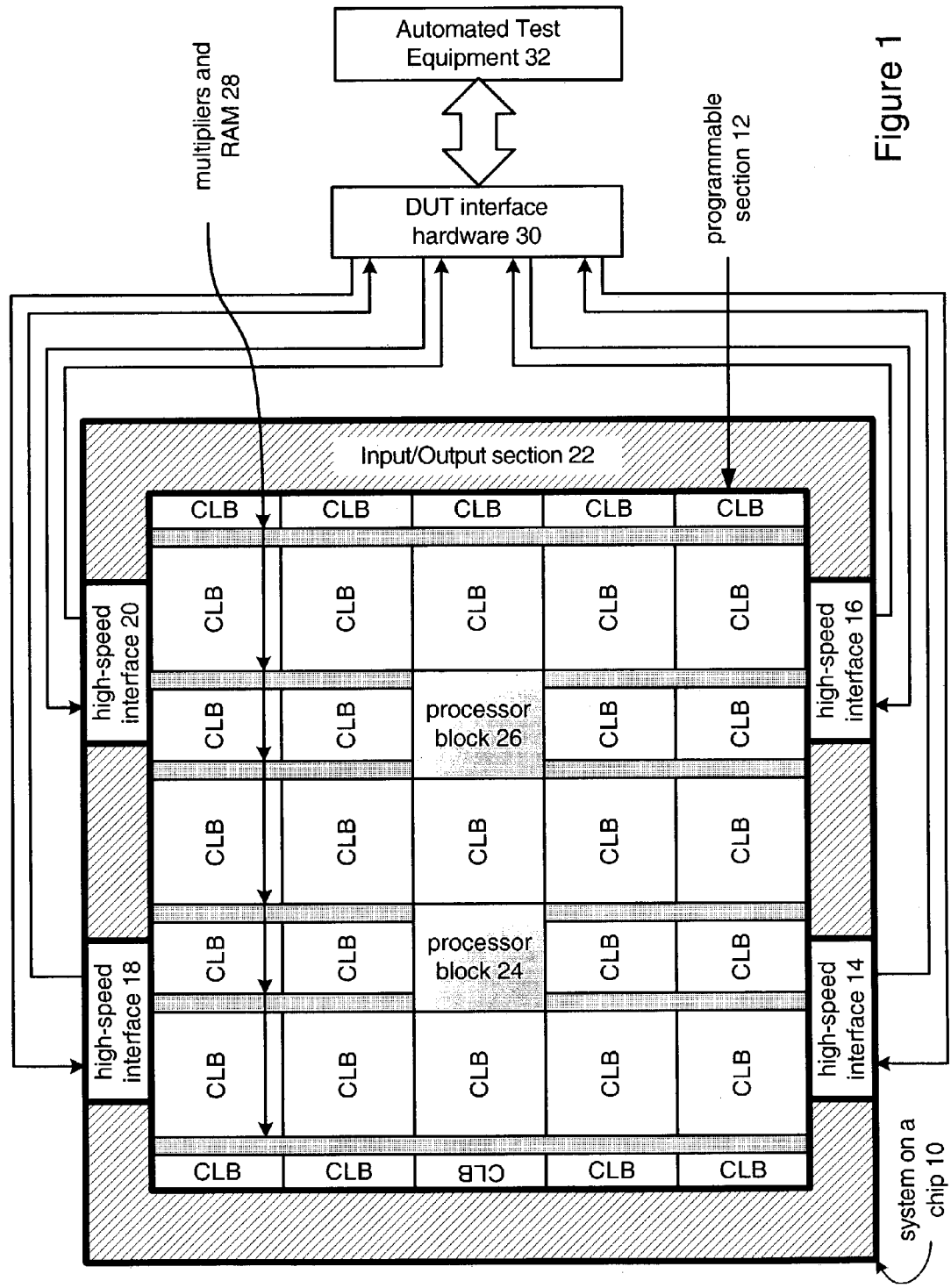
FIG. 1 is a schematic block diagram of a system-on-a-chip under test in accordance with the present invention.

FIG. 1 is a schematic block diagram of a system-on-a-chip 10 that is operably coupled for testing to automated test equipment 32 via a device under test (DUT) interface hardware 30. The system-on-a-chip 10 includes a programming section 12 and a plurality of high-speed interfaces 14–20 within an input/output section 22. The high-speed interfaces 14–20 may be serial interfaces, parallel interfaces, serial-to-parallel interfaces and/or parallel-to-serial interfaces. Further, the high-speed interfaces 14–20 may be configurable to support various data transmission rates and conform to various standards. For example, the high-speed interfaces 14–20 may be multi-gigabit transceivers (MGT) that convert a serial data stream having a bit rate of 1.25 gigabits-per-second to tens of gigabits-per-second into 32-bit parallel data at a rate of 600–800 megabits-per-second. Further, the plurality of high-speed interfaces 14–20 may be configurable to support various standards including SONET, SONET with forward error correction, ten gigabit Ethernet, fiber channel, et cetera.

The programmable section 12 includes a plurality of configurable logic blocks (CLB), a plurality of multiplier and RAM sections 28 and may further include processor blocks 24 and 26 (e.g., embedded microprocessors, digital signal processors, and/or state machines). As one of average skill in the art will appreciate, the system-on-a-chip 10 may include a fewer number or greater number of processor blocks 24 and 26 and the configurable logic blocks may correspond to field programmable gate array structure, programmable logic array structure, and/or any other type of programmable logic devices.

When the system-on-a-chip 10 is being tested, the present invention generally provides a testing approach with respect to the high-speed interfaces that utilizes the programmable section 12 to facilitate the testing of the high-speed interfaces 14–20. To test the high-speed interfaces 14–20, one of the high-speed interfaces 14–20 is tested at a $1^{st}$ level of testing with respect to one of the plurality of standards that the system-on-a-chip may be configured to support. To facilitate the $1^{st}$ level of testing, the programmable section 12 may be configured to generate periodic test signal waveforms and/or random pattern test signal waveforms. Based on these waveforms, the performance characteristics of one of the high-speed interfaces may be determined with respect to the $1^{st}$ level of testing. Generally, the first level of testing will correspond to the standard having the most stringent performance characteristic requirements for transceiving data. Such performance characteristic requirements include, but are not limited to, jitter tolerance, jitter transfer (i.e., how much jitter transfers from the input of the interface to the output of the interface), rise and fall times, bit error rate, drive capabilities of the interface, and receiver input sensitivity of the clock and/or data recovery circuit of the interface (e.g., receiver sensitivity is based on reducing amplitude of signal to determine a bit error rate and stressing the receiver to determine its clock and data recovery capabilities).

If the particular high-speed interface 14–20 passes the $1^{st}$ level of stringent testing, the remaining high-speed interfaces are inoperably coupled either via the programmable section 12, I/O section 22 and/or the DUT interface hardware 30 to be tested at a $2^{nd}$ level of testing. In general, the $2^{nd}$ level of testing may be a pass/fail testing. As one of average skill in the art will appreciate, a pass/fail test mechanism may consist of providing a test signal and routing it through the high-speed interfaces to verify that it is received properly and/or transmitted properly. To facilitate the $2^{nd}$ level of testing, the programmable section 12 may be configured to generate periodic test signals and/or random patterned test signals.

If a particular high-speed interface 14–20 fails the $2^{nd}$ level of testing, the entire system-on-a-chip 10 may be deemed to have failed testing, the particular high-speed interface may be flagged as being unusable and the remaining high-speed interfaces are enabled such that the part may be used with respect to a different level of application that requires a fewer number of high-speed interfaces 14–20. As one of average skill in the art will appreciate, the number of high-speed interfaces that may be included on a system-on-a-chip 10 may range from one high-speed interface up to tens of high-speed interfaces. Accordingly, if one of the high-speed interfaces fails the $2^{nd}$ level of testing, it may be effectively removed from the system-on-a-chip via the programmable section or through using other integrated circuit techniques (e.g., fusing) to effectively remove the failed interface from operation within the system-on-a-chip.

If the particular high-speed interface 14–20 that is tested at the $1^{st}$ level of testing fails the $1^{st}$ level of testing, the entire system-on-a-chip may be deemed to have failed testing, the particular high-speed interface may be tested with respect to another standard that has slightly less stringent performance characteristics requirements, and/or another one of the high-speed interfaces may be tested at the $1^{st}$ level of testing wherein the one failing the $1^{st}$ level of testing is flagged as unusable within the system-on-a-chip 10. As such, by utilizing the programmable section 12 to facilitate the testing of the high-speed interfaces 14–20 and doing so in a multi-tiered fashion, yield of the system-on-a-chip improves. The yield improvement results in that, by obtaining the performance characteristics of the high-speed interfaces, interfaces that fail to meet one level of testing, may pass another and then, instead of the chip being discarded, can be sold for applications corresponding to the other level of testing.

In addition, by utilizing the programmable section and testing the remaining high-speed interfaces via the $2^{nd}$ level testing in a more parallel fashion, the testing is more time efficient than the serial testing of the prior art. Further, since the programmable section 12 facilitates the testing of the high-speed interfaces, the automated test equipment 32 may be conventional equipment that analyzes the test results thereby providing a cost effective mechanism for testing a system-on-a-chip 10 that may have a plurality of variations of implementation and variations of performance requirements.

Figure 2:
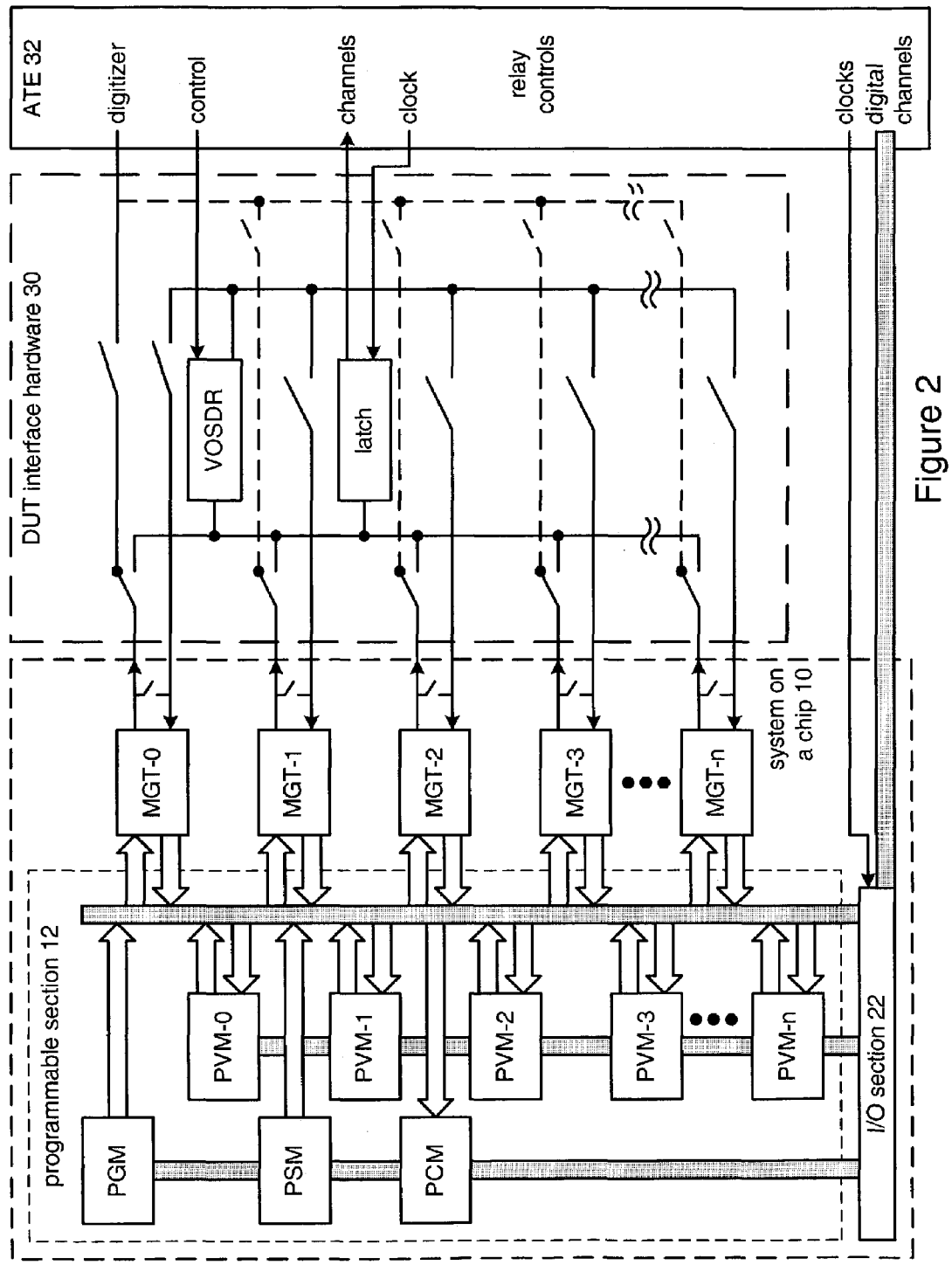
FIG. 2 is a schematic block diagram of an embodiment of the system-on-a-chip under test in accordance with the present invention.

FIG. 2 is a schematic block diagram that illustrates the programmable section 12 of the system-on-a-chip 14 being configured to test a plurality of high-speed interfaces, which may be multi-gigabit transceivers (MGT-0 through MGT-N). As is further illustrated, the device under test interface hardware 30 includes a latch, a variable output swing differential driver/receiver (VOSDR), and a plurality of switches. The automated test equipment 32 provides digitizer information, control information, clock signals, input information via the digital channels and/or monitors output information via the channels.

The programmable section 12 may be configured to include a parallel generator module (PGM), a parallel source module (PSM), a plurality of parallel verifier modules (PVM-0 through PVM-n) and a parallel capture module (PCM). To facilitate the testing of the multi-gigabit transceivers MGT-0 through MGT-N, each of which includes a receiver section that converts high-speed serial data into parallel data and includes a transmit section that converts parallel data into high-speed serial output data. As such, the programmable section 12 tests, via the PGM, PSM, PCM, and the PVMs, both the transmitter section and receiver section.

The parallel generator module (PGM), which will be described in greater detail with reference to FIG. 4, generates parallel pseudo random bit streams (PRBS) that are provided to one of the multi-gigabit transceivers for the $1^{st}$ level of testing and/or to all of the multi-gigabit transceivers for the $2^{nd}$ level of testing. For example, to test MGT-0 at the $1^{st}$ level of testing, the parallel generator module (PGM) provides the pseudo random bit streams to MGT-0. The DUT interface hardware 30 couples the serial bit stream output of MGT-0 to the latch, and subsequently provide it to the automated test equipment 32 for analysis. Further, the variable output swing differential driver/receiver (VOSDR), under the control of the ATE 32, varies the amplitude and/or routing of the serial test signals to and/or from the transmitter and the receiver of the MGT to facilitate the first level testing. The analysis, for the $1^{st}$ level of testing, will be with respect to one of a plurality of standards that has a series of prescribed performance characteristics that include, but are not limited to jitter tolerance, jitter transfer, rise and fall times, bit error rate, drive capabilities, and receiver input sensitivity of the data and/or clock recovery circuit.

Thus, for the testing of the transmit section of, for example, MGT-0, the automated test equipment will be analyzing the jitter tolerance of the signal, the jitter transfer, rise and fall times of the serial data and may further check the drive capabilities of the transmitter section. If, for this example, MGT-0 passes this test, since the remaining MGT's are fabricated on the same piece of silicon, their performances are assumed to be similar. Thus, if the remaining MGT's pass the $2^{nd}$ level of testing, it is assumed that they would of also passed the $1^{st}$ level of testing thereby providing a reliable analysis of the entire system-on-a-chip with respect to the high-speed interfaces.

To facilitate the $2^{nd}$ level of testing, the parallel generator module (PGM) provides, in parallel the pseudo random bit stream to the multi-gigabit transceivers MGT-0 through MGT-N. The device under test interface hardware 30 couples the transmitter sections and receiver sections of the multi-gigabit transceivers (MGT-0 through MGT-N) to facilitate the $2^{nd}$ level of testing via the plurality of switches, which may be a relay matrix. For example, the serial output data produced by the transmitter section of MGT-0 may be routed to the receiver section of MGT-1 to facilitate the testing of that receiver section. In parallel, or in a serial manner, the serial output of the transmitter of MGT-1 may be provided to the receiver section of MGT-2 for testing of the receiver section of MGT-2, and so on.

The parallel source module (PSM), which will be described in greater detail with reference to FIGS. 5 and 6, may be programmed via the ATE 32 to store various valid parallel data test patterns. Accordingly, the PSM includes memory for storing the valid parallel data test patterns, which may be provided to the multi-gigabit transceivers to facilitate the $1^{st}$ level testing of one of the MGT's and/or to facilitate the $2^{nd}$ level of testing of all the MGT's. The parallel source module (PSM) may be used in conjunction with the parallel generator module (PGM) to facilitate the $1^{st}$ level and/or $2^{nd}$ level of testing of the transmit section of each of the MGT's.

The parallel verifier modules (PVM-O through PVM-N), which will be discussed in greater detail with reference to FIG. 7, are configured within the programmable section 12 to analyze the expected pseudo random bit streams from the corresponding multi-gigabit transceivers and to track the number of bit errors. The parallel verifier module may be utilized for the $1^{st}$ level of testing and/or for the $2^{nd}$ level of testing to facilitate the testing of the receiver sections of each of the multi-gigabit transceivers. If the transmitter section of a multi-gigabit transceiver is coupled to its receiver section then the parallel verifier modules may be verifying both the transmitter section and receiver section of the same multi-gigabit transceiver.

The parallel capture module (PCM), which will be described in greater detail with reference to FIG. 8, is configured to capture the parallel signals produced by the receiver sections of the multi-gigabit transceivers. As the parallel data is received, it may be stored within the parallel capture module for subsequent analysis. The subsequent analysis may be at the $1^{st}$ level of testing and/or the $2^{nd}$ level of testing.

By configuring the programmable section to include the parallel generator module, the parallel source module, the parallel capture module and the parallel verifier modules, the system-on-a-chip 10 may be readily tested at a $1^{st}$ level of testing in accordance with the performance characteristics of a given standard of a plurality of standards and then used to test the remaining multi-gigabit transceivers at a $2^{nd}$ level (e.g., pass/fail level of testing). During the first level of testing, performance characteristics of the multi-gigabit transceivers are obtained, which may be used for analysis if failure occurs. Further, by utilizing the programmable section 12 to test the system-on-a-chip 10, the automated test equipment 32 may be conventional equipment thereby substantially reducing the cost of testing a system-on-a-chip while providing a thorough test mechanism. In addition, since the system-on-a-chip 10 may include a variety of configurations that include a varying number of multi-gigabit transceivers, or high-speed interface modules, the programmable section 12 may be configured to readily test the various embodiments of the system-on-a-chip 10.

Figure 3:
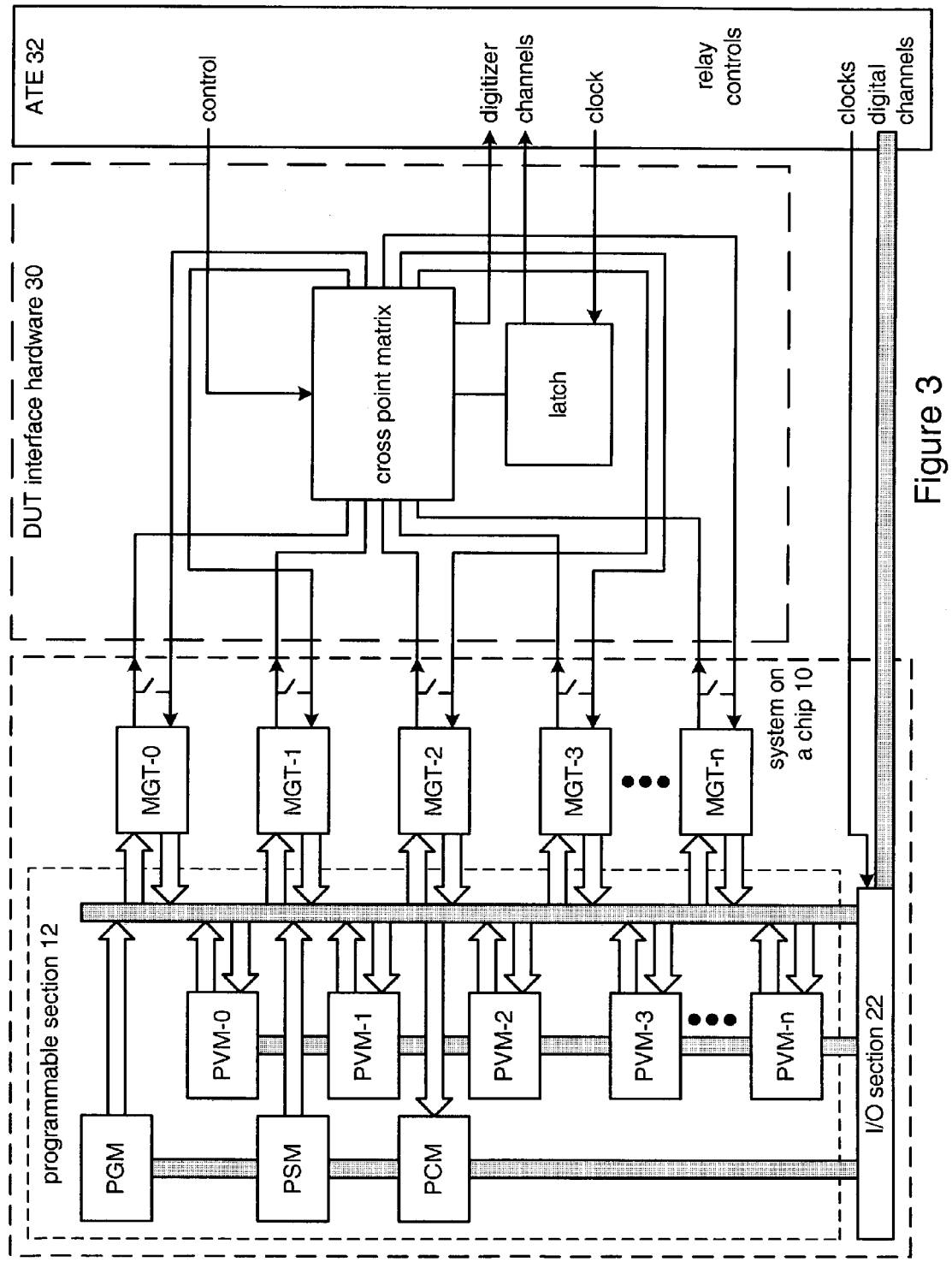
FIG. 3 is a schematic block diagram of an alternate configuration of the system-on-a-chip under test in accordance with the present invention.

FIG. 3 is a schematic block diagram of the system-on-a-chip 10 under test wherein the programmable section 12 is configured as previously described with reference to FIG. 2 and the DUT interface 30 includes a cross-point matrix and a latch. In this embodiment, the testing of the multi-gigabit transceivers via the programmable section 12 is done in a similar manner as described with reference to FIG. 2, yet the coupling for the $1^{st}$ and/or $2^{nd}$ level testing via the DUT hardware interface 30 is done utilizing the cross-point matrix. The cross-point matrix provides the connectivity of the transmitter output of one of the MGT's to the receiver input of another MGT for $2^{nd}$ level testing and to the ATE 32. Such a cross-point matrix may be limited (utilizing current cross-point matrix technology) to a serial data rate of 3.125 gigabits-per-second.

FIG. 4 is a schematic block diagram of the parallel generator module (PGM) as programmed within the programmable section 12. In this embodiment, the parallel generator module includes a pseudo random bit stream (PRBS) generator 40, a multiplexer 42, and an MGT destination section 44. The PRBS generator 40 generates a pseudo random bit stream that is provided to multiplexer 42. Via a channel select input from the automated test equipment 32, the MGT destination section 44 enables multiplexer 42 to provide the pseudo random bit stream to one or more of the multi-gigabit transceivers (MGT-0 through MGT-N) to facilitate the first and/or second level testing. Note that the pseudo random bit stream corresponds to 32-bit transmit data that is provided to the transmit section of one or more of the MGT's. The transmitter section of the corresponding MGT produces a serial bit stream that may range from 1.25 gigabits-per-second to tens of gigabits-per-second. To facilitate the testing, the generation of the pseudo random bit stream via generator 40 may be controlled via a start input, a stop input, and a duration input (e.g., number of bits).

FIG. 5 illustrates one embodiment of a parallel source module (PSM) that is configured within the programmable section 12. The PSM includes a memory controller 46, memory 48, a multiplexer 42 and the MGT destination module 44. In this embodiment, the ATE 32 may load memory 48 with valid parallel data. The memory 48 should include a minimum of 512 parallel data elements. To facilitate the first and/or second level testing, memory controller 46 includes inputs that start, stop, repeat the sending of data, indicate the start address and stop of address of the data to be sent.

The MGT destination module 44, based on channel select information from the automated test equipment 32, enables the multiplexer 42 to provide the stored valid parallel data, as, for example, 32-bit transmit data, to one or more of the multi-gigabit transceivers for testing of the transmitter section of the transceiver. Note that the programming of the programmable section 12 and the loading of the data into memory can occur at a convenient frequency for the automated test equipment. Further, a repetitive bit stream may be sent through the transmit section which allows for under sampling of the serial output to occur.

FIG. 6 is an alternate schematic block diagram of the parallel source module (PSM) that may be programmed within the programmable section 12. In this embodiment, the PSM includes a plurality of 4-to-1 multiplexers for each of the parallel transmit inputs of the programmable section. The multiplexer 42 provides the inputs as 32-bit transmit data to one or more of the transceiver sections of the multi-gigabit transceivers. By utilizing the multiplexers in this manner, the automated test equipment may run at a speed $\frac{1}{4}^{th}$ that of the parallel interface to provide 4 bits of data on four different input/outputs for each input. By generating the parallel data via the ATE and passing it through the parallel source module, as opposed to storing it as in the embodiment of FIG. 5, a larger number of data sets may be sent and/or received.

FIG. 7 is a schematic block diagram of a parallel verifier module (PVM) that may be programmed with the programmable section 12. The parallel verifier module includes a pseudo random bit stream (PRBS) verifier 64, a multiplexer 60 and an MGT destination module 62. In this configuration, the parallel verifier module facilitates the verifying of the receiver portions of the multi-gigabit transceivers. Based on the channel select information received via the automated test equipment 32, the MGT destination module 62 provides the 32-bit receiver data from one or more multi-gigabit transceivers to the PRBS verifier 64. The PRBS verifier analyses the 32-bit receive data in comparison to the expected stream of data and tracks the number of bit errors. To facilitate the verification process, the PRBS verifier 64 includes a start input, stop input, read input and clear input where the reading allows for the reading of the error rates for subsequent analysis via the automated test equipment.

FIG. 8 illustrates a schematic block diagram of the parallel capture module (PCM) as may be configured within the programmable section 12. The parallel capture module includes a memory controller 66, memory 68, multiplexer 60 and an MGT destination module 62. In this embodiment, based on a channel select input from the automated test equipment, the MGT destination module 62 enables the multiplexer 60 to provide 32-bit received data from one or more of the multi-gigabit transceivers to the memory controller 66. The 32-bit receive data corresponds to serial data received by the receiver section and converted into parallel data.

The memory controller includes a start input, a stop input, a trigger input, a start address and a stop address to facilitate the verification of the 32-bit received data during the test mode. Such an implementation allows a trigger data pattern to be specified through the controller. Upon encountering the trigger data pattern, the memory controller 66 begins storing the parallel data into memory, starting at a specified start address and continuing until the stop address is reached. The memory 68 should store a minimum of 512 parallel data elements. The captured parallel data in memory 68 may subsequently be retrieved by the automated test equipment 32 at rates convenient for the automated test equipment to analyze the stored parallel data.

Figure 9:
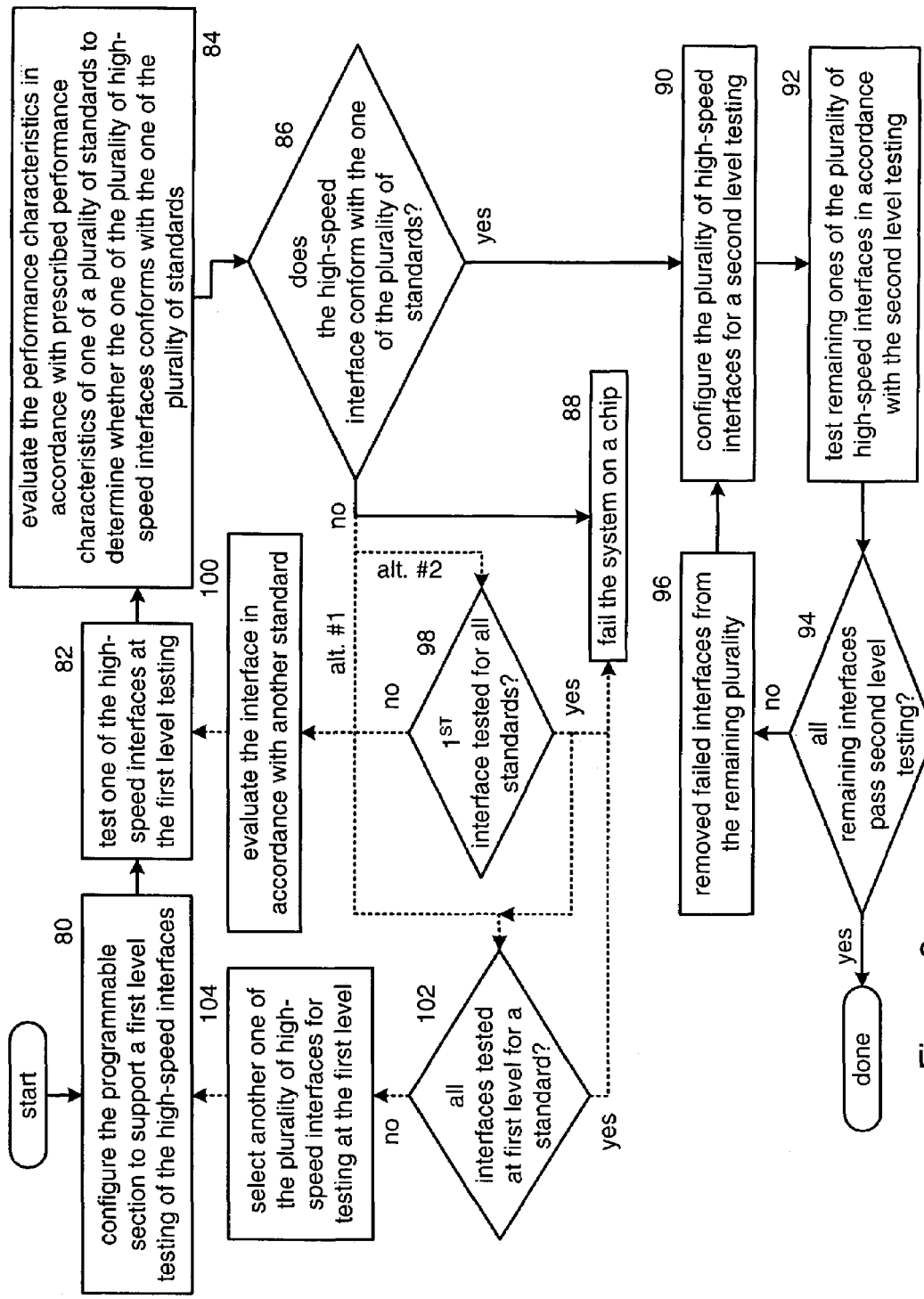
FIG. 9 is a logic diagram of a method for testing a system-on-a-chip that includes a programmable section and a plurality of high-speed interfaces in accordance with the present invention.

FIG. 9 is a logic diagram of a method for testing a system-on-a-chip that includes a programmable section and a plurality of high-speed interfaces. The process begins at Step 80 where the programmable section is configured to support a $1^{st}$ level testing of the high-speed interfaces. This may be done by configuring the programmable section to function as a parallel pseudo random bit stream generator, as a parallel source module, as a plurality of multiplexers, as a parallel verification module, and/or as a parallel capture module. The functionality of such configurable modules was discussed with reference to FIGS. 2–8.

The process then proceeds to Step 82 where one of the high-speed interfaces is tested at the $1^{st}$ level of testing to produce tested performance characteristics of the high-speed interface. The $1^{st}$ level of testing may be done to obtain performance characteristics regarding the transmit and/or receive functionality of the high-speed interface, which may be a multi-gigabit transceiver. The performance characteristics include jitter tolerance, jitter transfer, rise and fall times, bit error rate, drive capabilities, and receiver input sensitivity with respect to clock and/or data recovery. The process then proceeds to Step 84 where the tested performance characteristics of the high-speed interface are evaluated in accordance with prescribed performance characteristics of one of a plurality of standards to determine whether the high-speed interface conforms with the requirements of the standard. For example, the system-on-a-chip may be utilized in a variety of applications that have various standard requirements. Such standards may include, but are not limited to SONET, SONET with forward error correction, 10-gigabit Ethernet, fiber channel and/or any other high-speed serial-to-parallel and parallel-to-serial interface.

The process then proceeds to Step 86 where a determination is made as to whether the high-speed interface conforms with the requirements of the standard. If yes, the process proceeds to Step 90 where the plurality of high-speed interfaces are configured for $2^{nd}$ level testing. The plurality of high-speed interfaces may be configured for the $2^{nd}$ level testing by coupling the plurality of high-speed interfaces in a daisy chain manner utilizing a relay matrix and a variable output swing differential driver/receiver based on a $1^{st}$ control signal from automated test equipment or by coupling the plurality of high-speed interfaces in a daisy chain manner utilizing a cross-point matrix based on a $2^{nd}$ control signal from the automated test equipment.

The process then proceeds to Step 92 where the remaining high-speed interfaces are tested in accordance with the $2^{nd}$ level testing. This may be done by providing a periodic pattern signal or a random pattern signal to the high-speed interfaces and performing a pass/fail test on each of the remaining high-speed interfaces based on the accuracy of receiving and/or transmitting the periodic pattern signal and/or the random pattern signal. The $2^{nd}$ level testing may also be done by under-sampling serial transmitted data from one of the daisy chained high-speed interfaces via a latch to capture a sub-set of the serial transmit data. The sub-set is then stored via automated test equipment. The testing continues by under-sampling an offset portion of the serial transmit data from the high-speed interface via the latch to capture a $2^{nd}$ sub-set of the serial transmit data which is subsequently stored. The under-sampling continues until a substantially complete test pattern has been stored. Once the test pattern has been stored, it is compared with an expected test pattern to determine whether the particular high-speed interface passes the $2^{nd}$ level testing. As an alternative testing under-sampling technique, a cross-point matrix may be used to facilitate the testing.

The process then proceeds to Step 94 where a determination is made as to whether all the remaining interfaces have passed the $2^{nd}$ level test. If so, the process is complete and the system-on-a-chip has passed testing with respect to the high-speed interfaces. If, however, one of the remaining interfaces fails the $2^{nd}$ level testing, the process proceeds to Step 96. At Step 96, the failed interface, or interfaces, is removed from the remaining plurality of interfaces such that it is effectively removed from the system-on-a-chip. The process then repeats at Step 90 where the $2^{nd}$ level testing continues for the remaining interfaces less the flagged failed interfaces.

If, at Step 86, the high-speed interface does not conform with the requirements of the particular standard, several options may be followed. The $1^{st}$ option, as shown at Step 88, has the entire system-on-a-chip failing. Another alternative proceeds to Step 102 where a determination is made as to whether all the interfaces have been tested with respect to the $1^{st}$ level testing that corresponds to a particular standard. If yes, the process reverts to Step 88 where the system-on-a-chip has failed. If not, the process proceeds to Step 104 where another one of the plurality of high-speed interfaces is selected for testing at the $1^{st}$ level for the particular standard. The process then repeats at Step 80 for this particular interface.

As yet another alternative, the process may proceed to Step 98 where a determination is made as to whether the $1^{st}$ level of testing for all of the various standards has been performed. As previously mentioned, each standard has different performance characteristic requirements, where some standards have more stringent performance characteristics than others. Typically, the system-on-a-chip is initially tested using the most stringent performance requirements. However, if an interface fails at this high performance level, it may still pass lower performance requirements of another standard and thus is tested with respect to the standard having the next most stringent performance requirements and testing in this manner continues unit the interface passes the first level testing for one of the standards or until the interface has been tested at the first level with respect to all of the standards. If the interface has been tested at the first level for all the standards, the process proceeds to step 88, where the system on a chip is deemed to have failed testing.

If the interface has not be tested at the first level with respect to all of the standards, the process proceeds to Step 100 where the particular interface is evaluated in accordance with another standard. The process then repeats at Step 82. In this instance, by testing to a lower performance requirement, the system-on-a-chip may be flagged for a particular standard and thus sold for that particular application and excluding the more stringent standard application. Thus, the yield increases when the chip can be marked for particular performance requirements as opposed to be discarded for failing the more stringent testing. Similarly, with removing interfaces that fail the $2^{nd}$ level of testing, a system on a chip may be marked for a particular application requiring less interfaces and thus sold as opposed to being discarded. Accordingly, the yield of the integrated circuits due to such a testing method is enhanced.

Figure 10:
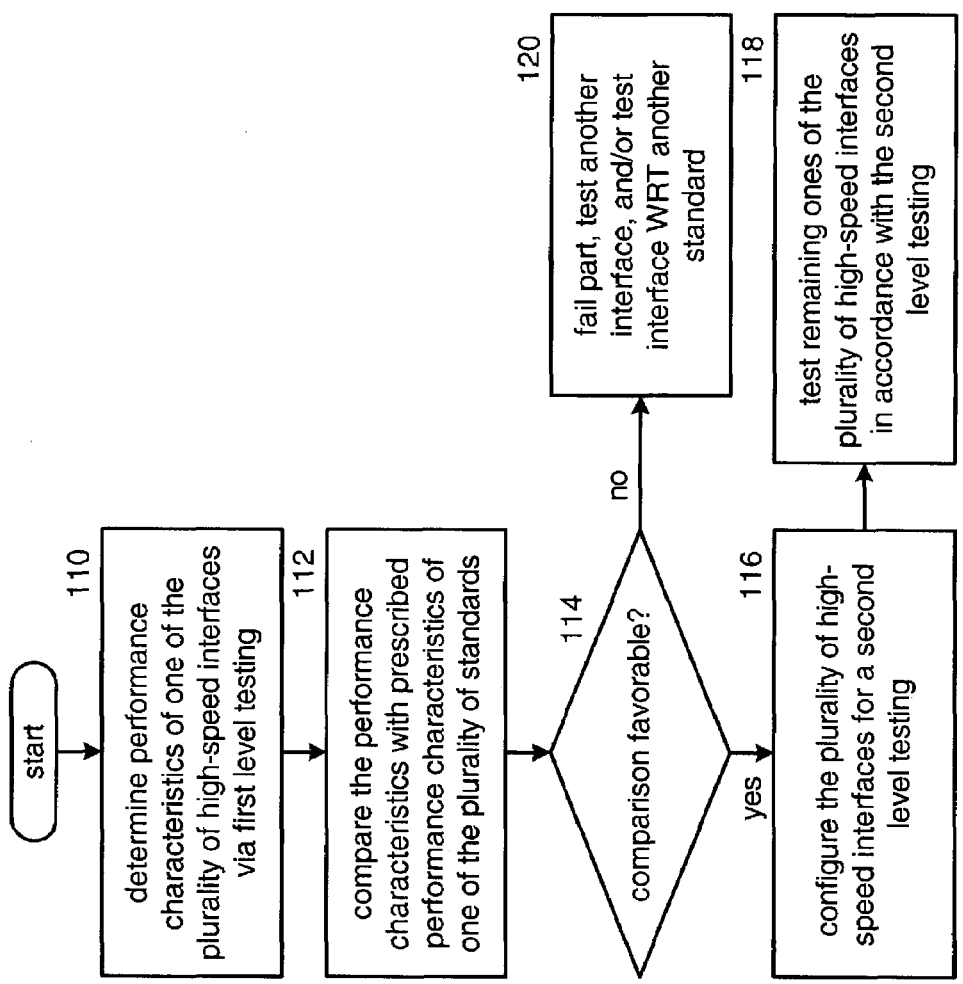
FIG. 10 is a logic diagram of an alternate method for testing a system-on-a-chip that includes a programmable section and a plurality of high-speed interfaces in accordance with the present invention.

FIG. 10 is a logic diagram of an alternate method for testing a system-on-a-chip that includes a plurality of high-speed interfaces. The process begins at Step 110 where performance characteristics of one of the high-speed interfaces are determined via a $1^{st}$ level testing. This may be done by configuring a programmable section of the system-on-a-chip to facilitate the testing. Examples of configuring the programmable section were given in FIGS. 2–8. The process then proceeds to Step 112 where the performance characteristics are compared with prescribed performance characteristics of one of a plurality of standards.

The process then proceeds to Step 114 where a determination is made as to whether the comparison was favorable. If not, the process proceeds to Step 120 where the part is deemed to have failed the test, another interface may be tested with respect to the particular standard, and/or another standard may be used to test the interface as previously described with reference to Steps 98–104 of FIG. 9.

If, however, the comparison was favorable, the process proceeds to Step 116 where the plurality of high-speed interfaces are configured for a $2^{nd}$ level testing. Note that the $1^{st}$ level of testing is more stringent than the $2^{nd}$ level of testing. The process then proceeds to Step 118 where the remaining ones of the plurality of high-speed interfaces are tested in accordance with the $2^{nd}$ level testing.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented a method and apparatus for testing a system-on-a-chip. By utilizing a programmable section of the system-on-a-chip, and effective and thorough test mechanism may be economically achieved for such system-on-a-chips. As one of average skill in the art will appreciate, other embodiments may be derived from the teachings of the present invention without deviating from the scope of the claims.

What is claimed is:

1. A method for testing a system on a chip having a programmable section and a plurality of high-speed interfaces, the method comprises:
   configuring the programmable section to support a first level testing of the plurality of high-speed interfaces;
   testing one of the plurality of high-speed interfaces at the first level testing via the programmable section, wherein the first level testing tests performance characteristics of the one of the plurality of high-speed interfaces to produce tested performance characteristics;
   evaluating the tested performance characteristics in accordance with prescribed performance characteristics of one of a plurality of standards to determine whether the one of the plurality of high-speed interfaces conforms with the one of the plurality of standards;
   when the one of the plurality of high-speed interfaces conforms with the one of the plurality of standards, configuring the plurality of high-speed interfaces for a second level testing; and
   testing remaining ones of the plurality of high-speed interfaces in accordance with the second level testing.

2. The method of claim 1, wherein the programmable section further comprises at least one of: a field programmable gate array (FPGA), a microprocessor, and memory.

3. The method of claim 1, wherein each of the plurality of high-speed interfaces further comprises a multi-gigabit transceiver.

4. The method of claim 1, wherein the first level testing is more stringent than the second level testing, and wherein the testing the remaining ones of the plurality of high-speed interfaces in accordance with the second level testing further comprises:
   providing at least one of a periodic patterned signal and a random patterned signal to the plurality of high-speed interfaces; and
   performing a pass/fail test on the remaining ones of the plurality of high-speed interfaces based on the at least one of the periodic patterned signal and the random patterned signal.

5. The method of claim 1, wherein the configuring the programmable section further comprises at least one of:
   configuring the programmable section to function as a parallel pseudo random bit stream (PRBS) generator that provides, in parallel, random parallel test signals to at least some of the plurality of high-speed interfaces;
   configuring the programmable section to function as a parallel source module that stores, and subsequently provides, parallel test signals to the at least some of the plurality of high-speed interfaces;
   configuring the programmable section to function as a plurality of multiplexers operably coupled to automatic test equipment (ATE), wherein the ATE configures the plurality of multiplexers to provide, in parallel, ATE generated test signals to the at least some of the plurality of high-speed interfaces and to provide processed ATE generated test signals from the at least some of the plurality of high-speed interfaces to the ATE, wherein the ATE determines which of the at least some of the plurality of high-speed interfaces passes the second level testing based on the ATE generated test signals;
   configuring the programmable section to function as a parallel verification module that determines which of the at least some of the plurality of high-speed interfaces passes the second level testing based on the parallel random test signals; and
   configuring the programmable section to function as a parallel capture module that determines which of the at least some of the plurality of high-speed interfaces passes the second level testing based on the parallel test signals.

6. The method of claim 1, wherein the configuring the plurality of high-speed interfaces for a second level testing further comprises at least one of:
   coupling the plurality of high-speed interfaces in a daisy chain manner utilizing a variable output swing differential driver/receiver and a relay matrix based on a first control signal from automatic test equipment; and
   coupling the plurality of high-speed interfaces in a daisy chain manner utilizing a cross-point matrix based on a second control signal from the automatic test equipment.

7. The method of claim 6, wherein the testing remaining ones of the plurality of high-speed interfaces in accordance with the second level testing further comprises:
   under-sampling serial transmit data from one of the daisy chained plurality of high-speed interfaces via a latch to capture a sub-set of the serial transmit data;
   storing the sub-set of the serial transmit data via automatic test equipment;
   under-sampling an offset portion of the serial transmit data from the one of the daisy chained plurality of high-speed interfaces via the latch to capture a second sub-set of the serial transmit data;
   storing the second sub-set of the serial transmit data;
   repeating the under-sampling different portions of the serial transmit data and storing corresponding sub-sets of the serial transmit data until a substantially complete test pattern has been stored; and
   comparing the substantially complete test pattern with an expected test pattern to determine whether the one of the daisy chained plurality of high-speed interfaces passes the second level testing.

8. The method of claim 7, wherein the first level testing is more stringent than the second level testing, and further comprising:
   when the one of the plurality of high-speed interfaces fails the second level testing, removing the one of the plurality of high-speed interfaces from the daisy chain; and
   repeating the testing without the one of the plurality of high-speed interfaces.

9. The method of claim 6, wherein the testing remaining ones of the plurality of high-speed interfaces in accordance with the second level testing further comprises:

under-sampling serial transmit data from one of the daisy chained plurality of high-speed interfaces via a latch and a cross-point matrix to capture a sub-set of the serial transmit data;

storing the sub-set of the serial transmit data via automatic test equipment;

under-sampling an offset portion of the serial transmit data from the one of the daisy chained plurality of high-speed interfaces via the latch and the cross-point matrix to capture a second sub-set of the serial transmit data;

storing the second sub-set of the serial transmit data;

repeating the under-sampling different portions of the serial transmit data and storing corresponding sub-sets of the serial transmit data until a substantially complete test pattern has been stored; and comparing the substantially complete test pattern with an expected test pattern to determine whether the one of the daisy chained plurality of high-speed interfaces passes the second level testing.

10. The method of claim 9 further comprises:

when the one of the plurality of high-speed interfaces fails the second level testing, removing the one of the plurality of high-speed interfaces from the daisy chain; and repeating the testing without the one of the plurality of high-speed interfaces.

11. The method of claim 1 further comprises at least one of:

when the one of the plurality of high-speed interfaces does not conform with the prescribed performance characteristics of the one of the plurality of standards, evaluating the performance characteristics in accordance with another one of a plurality of standards to determine whether the one of the plurality of high-speed interfaces conforms with prescribed performance characteristics of the another one of the plurality of standards, wherein the prescribed performance characteristics of the another one of the plurality of standards are less stringent than the prescribed performance characteristics of the one of the plurality of standards;

when the one of the plurality of high-speed interfaces does not conform with the prescribed performance characteristics of the one of the plurality of standards, indicating that the one of the plurality of high-speed interfaces as failing the first level testing and testing another one of the plurality of high-speed interfaces at the first level testing; and when the one of the plurality of high-speed interfaces does not conform with the prescribed performance characteristics of the one of the plurality of standards, failing the system on a chip.

* * * * *